(12) United States Patent
Chol et al.

(10) Patent No.: US 7,174,879 B1
(45) Date of Patent: Feb. 13, 2007

(54) VIBRATION-BASED NVH CONTROL DURING IDLE OPERATION OF AN AUTOMOBILE POWERTRAIN

(75) Inventors: Michael Chol, Garden City, MI (US); Stephen B. Smith, Livonia, MI (US); Gopichandra Surnilla, West Bloomfield, MI (US); Imad Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/352,069

(22) Filed: Feb. 10, 2006

(51) Int. Cl.
*F02P 5/00* (2006.01)
*F02M 1/00* (2006.01)

(52) U.S. Cl. ............ 123/406.21; 123/434; 123/406.11

(58) Field of Classification Search ............... 123/434, 123/435, 339.1, 339.11, 406.11, 406.16, 406.21, 123/406.29, 406.37
See application file for complete search history.

(56) References Cited

U.S. PATENT DOCUMENTS

| | | | |
|---|---|---|---|
| 4,741,164 A | * | 5/1988 | Slaughter ............... 60/627 |
| 5,392,642 A | | 2/1995 | Tao |
| 5,542,389 A | * | 8/1996 | Miyamoto et al. ....... 123/339.1 |
| 6,196,184 B1 | | 3/2001 | Przymusinski et al. |
| 6,536,389 B1 | | 3/2003 | Shelby et al. |
| 6,840,235 B2 | | 1/2005 | Koseki et al. |
| 6,901,328 B2 | | 5/2005 | Damson et al. |
| 2005/0165536 A1 | | 7/2005 | Fukasawa et al. |
| 2005/0188931 A1 | | 9/2005 | Akasaka et al. |

* cited by examiner

*Primary Examiner*—John T. Kwon
(74) *Attorney, Agent, or Firm*—Allen J. Lippa; Alleman Hall McCoy Russell & Tuttle LLP

(57) ABSTRACT

A system and method of operating a vehicle powertrain that employs active control to reduce NVH, particularly during idle. The method includes selectively operating the powertrain in at least a non-idle condition and an idle condition; receiving vibration signals from a sensor disposed on an internal combustion engine; controlling spark timing of the internal combustion engine based on vibration signals received from the sensor; and during the idle condition, modifying a speed and/or a load of the internal combustion engine based on vibration signals received from the sensor.

22 Claims, 5 Drawing Sheets

VIBRATION-BASED NVH CONTROL DURING IDLE OPERATION OF AN AUTOMOBILE POWERTRAIN

BACKGROUND AND SUMMARY

Noise, vibration and harshness (NVH) during operation of an automobile can greatly affect customer satisfaction with the vehicle. Accordingly, NVH considerations are now commonly taken into consideration during design and manufacture of automobiles. NVH results from vibration of various parts of the automobile, such as the engine (and engine mounts), body panels, chassis, exhaust piping, etc. The vibration can produce undesirable noise in the passenger compartment, and can be transmitted through components such as the seats, steering wheel, etc. to vehicle occupants. NVH can be particularly noticeable during idle.

One proposed solution to controlling NVH during idle involves consideration of certain natural frequencies of the vehicle. Through testing or other methods, natural frequencies are determined for various components of the vehicle. The control systems of the vehicle that govern idle engine speed are then designed taking the natural frequencies into consideration. For example, idle speed control is often implemented so that piston firing frequencies at idle do not amplify natural frequencies, for example by creating resonance. The inventors have recognized a problem with this solution, namely that the parameters of idle speed control are fixed at design time, and do not account for wear and break-in, or for dynamically changing conditions arising during operation of the vehicle.

Accordingly, the present disclosure provides a system and method of operating a vehicle powertrain that employs active control to reduce NVH, particularly during idle. The method includes selectively operating the powertrain in at least a non-idle condition and an idle condition; receiving vibration signals from a sensor disposed on an internal combustion engine; controlling spark timing of the internal combustion engine based on vibration signals received from the sensor; and during the idle condition, modifying a speed and/or a load of the internal combustion engine based on vibration signals received from the sensor.

DETAILED DESCRIPTION

Figure 1:
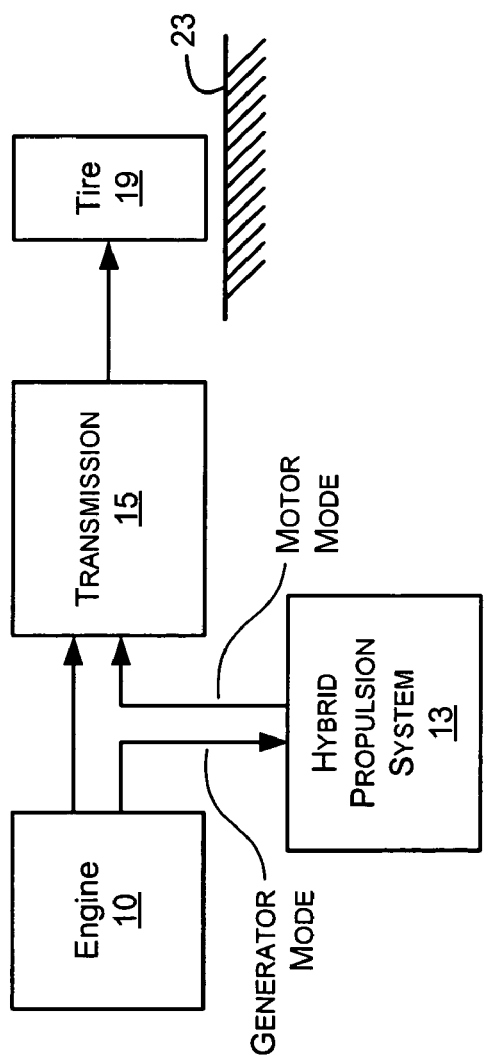
FIG. 1 is a schematic of a vehicle according to the present description
Figure 1A:
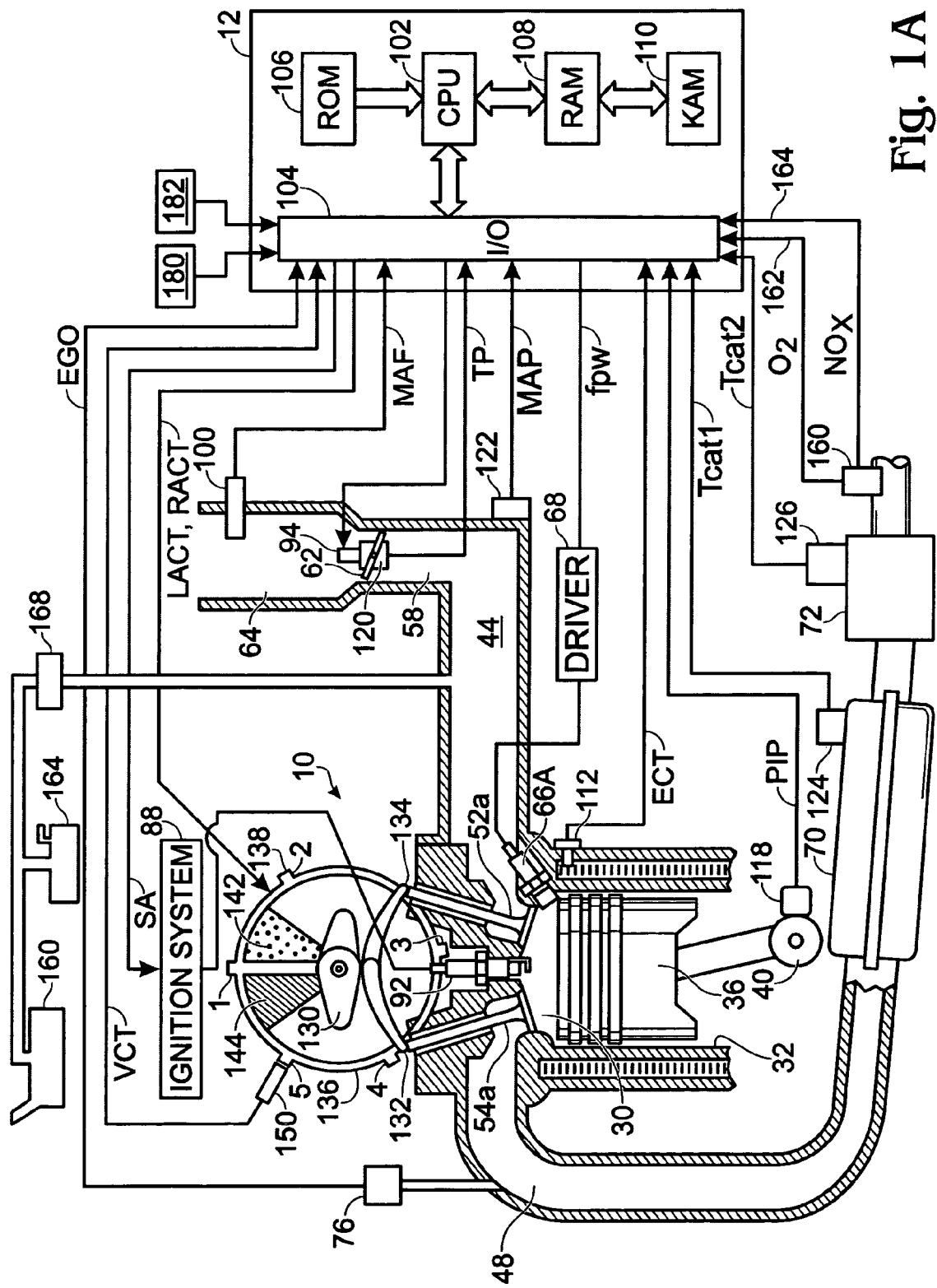
FIGS. 1A and 1B are schematic depictions of an internal combustion engine.
Figure 1B:
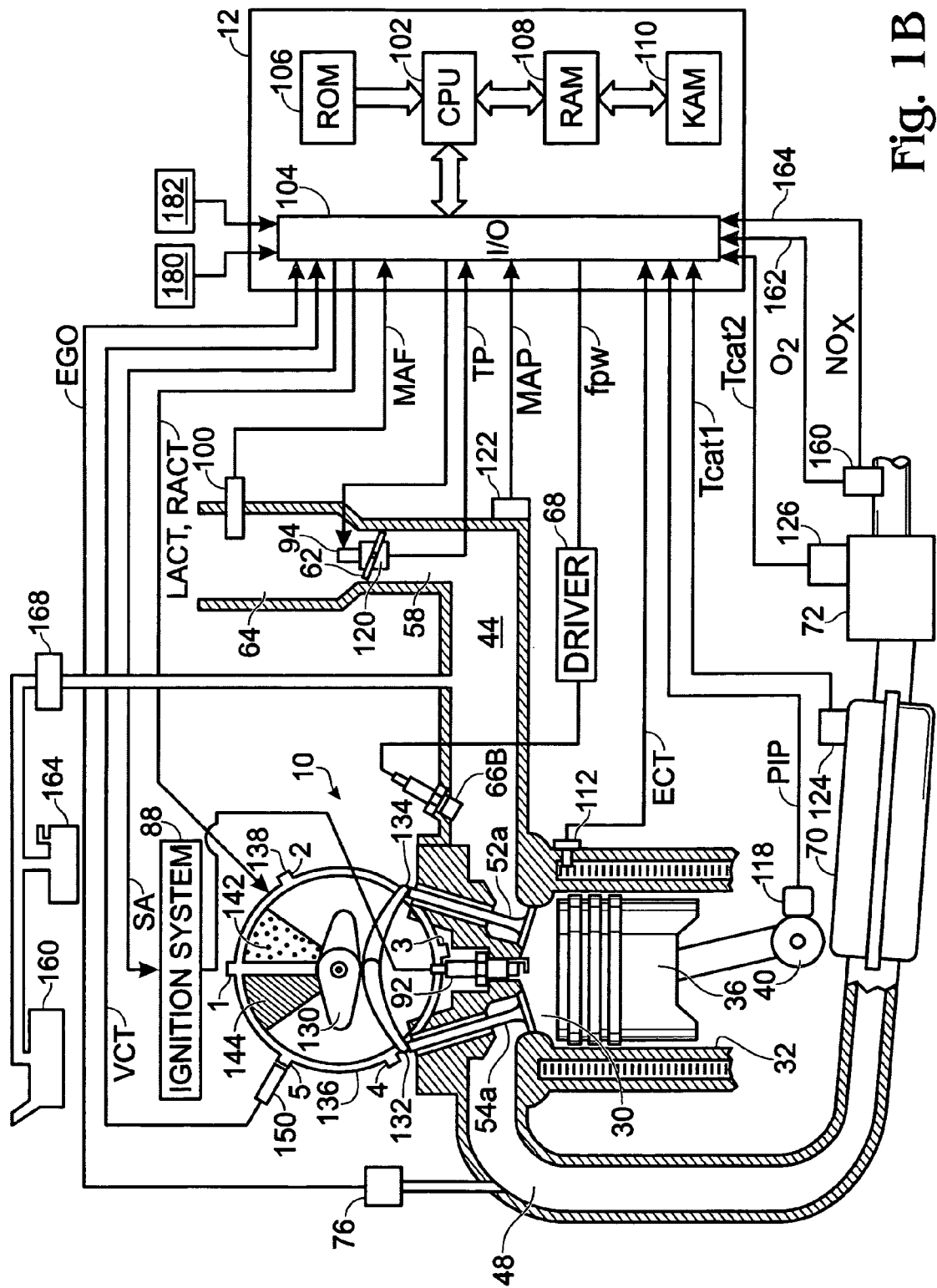

Referring to FIG. 1, internal combustion engine 10, further described herein with particular reference to FIGS. 1A and 1B, is shown coupled to transmission 15. Typically, the engine is coupled to a torque converter via a crankshaft (not shown), and the torque converter in turn is coupled to transmission 15 via a turbine shaft (not shown) or other mechanical connection providing an input shaft to the transmission. The torque converter has a bypass, or lock-up clutch (not shown) which can be engaged, disengaged, or partially engaged. When the clutch is either disengaged or partially engaged, the torque converter is said to be in an unlocked state. The lock-up clutch can be actuated electrically, hydraulically, or electro-hydraulically, for example. The lock-up clutch receives a control signal from the controller, described in more detail below. The control signal may be a pulse width modulated signal to engage, partially engage, and disengage, the clutch based on engine, vehicle, and/or transmission operating conditions. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19, for example via an axle. Tire 19 interfaces the vehicle (not shown) to the road 23. Note that in one example embodiment, this powertrain is coupled in a passenger vehicle that travels on the road. In another example embodiment, the powertrain also includes a hybrid propulsion system 13.

The depicted connections between engine 10, hybrid propulsion system 13, transmission 15 and tire 19 indicate transmission of mechanical energy from one component to another. For example, torque may be transmitted from engine 10 to drive the vehicle wheels and tire 19 via transmission 15. Hybrid propulsion system 15 may be configured to operate in a generator mode and/or a motor mode. In the generator mode, hybrid propulsion system absorbs some or all of the output from engine 10, which reduces the amount of output delivered by the engine to transmission 15. Generator mode may be employed, for example, to achieve efficiency gains through regenerative braking. In particular, the output received by the hybrid propulsion system may be used to charge a battery or other energy storage device. In motor mode, the hybrid propulsion system supplies mechanical output to transmission 15, for example by using electrical energy stored during generator operation.

Hybrid propulsion embodiments may include full hybrid systems, in which the vehicle can run on just the engine, just the hybrid propulsion system, or a combination of both. Assist or mild hybrid configurations may also be employed, in which the engine is the primary torque source, with the hybrid propulsion system acting to selectively deliver added torque, for example during tip-in or other conditions.

FIGS. 1A and 1B show one cylinder of a multi-cylinder engine, as well as the intake and exhaust path connected to that cylinder. Continuing with FIG. 1A, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In hybrid propulsion embodiments, the starter motor may be integrated with hybrid propulsion system 13. In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Note that sensor 76 corresponds to various different sensors, depending on the exhaust configuration as described below with regard to FIG. 2. Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12. Though spark ignition components are shown, engine 10 (or a portion of the cylinders thereof) may be operated in a compression ignition mode, with or without spark assist, as explained in more detail below.

Controller 12 may be configured to cause combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous spark-ignition mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel ratio being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. It will be understood that various different types and configurations of emission control devices and purging systems may be employed.

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; and an indication of knock from knock sensor 182. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller a voltage indicative of the $O_2$ concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration.

As described above, FIGS. 1A (and 1B) merely show one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly to cylinder 30.

It will be appreciated that the examples of FIGS. 1A and 1B are but two examples, and that many other engine configurations are possible. For example, instead of the cam mechanisms discussed above, intake and exhaust valves (e.g., intake valves 52a, 52b and exhaust valves 54a, 54b) may be actuated electromechanically or electro-hydraulically.

The operation of the engine and powertrain embodiments discussed herein may be designed or controlled to maintain noise, vibration and harshness (NVH) within acceptable levels. NVH can arise from a number of sources. Operation of the powertrain produces vibration at various frequencies, due to piston firing frequency, oscillations of the engine block, etc. These vibrations can align with other natural frequencies of vehicle components such as the steering column, chassis, wheels, body panels, etc. This alignment can produce vibrations which are undesirable and can be a source of customer dissatisfaction with the vehicle. Furthermore, NVH is usually more noticeable during idle, due to the lower piston firing frequencies and reduced exterior noise.

Accordingly, the example engine embodiments described herein are designed or tuned to provide smooth idle operation and maintain NVH to acceptable levels. Electronic engine controller 12 may be configured to control engine speed at idle based on various inputs, such as temperature, gear, airflow, etc. In variable displacement embodiments, the number of activated cylinders may also affect the controlled engine speed at idle to maintain satisfactory idle NVH levels. These are but examples, many factors, and combinations thereof, may act as inputs to idle speed control.

Regardless of the specific factors considered, the idle speed typically is controlled so that the engine vibrations do not align with known natural frequencies of other vehicle components. During the operative life of the vehicle, however, design-time considerations typically will change, for example due to break-in, wear, etc. NVH at idle may thus change over time.

Figure 2:
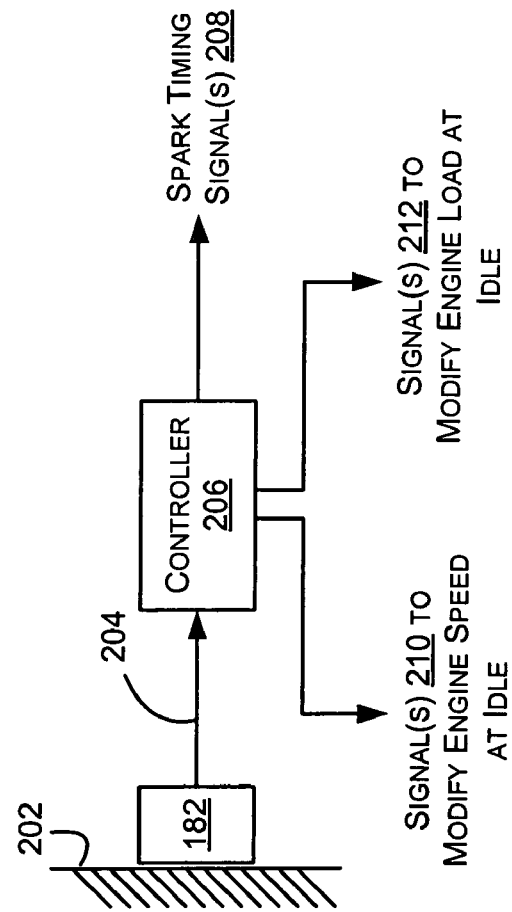
FIG. 2 is a schematic depiction of a control system responsive to signals received from a vibration sensor.

Accordingly, other exemplary embodiments and methods described herein may include active control of powertrain operation during idle to address NVH. FIG. 2 depicts an example in which engine speed and/or load at idle is modified to address NVH, based on vibration signals from a vibration sensor. Referring particularly to the figure, knock sensor 182 is shown disposed in operative proximity to engine block 202. Knock sensor provides vibration signals 204 to controller 206, which may be electronic engine controller 12 (FIGS. 1A and 1B).

According to one example, vibration signals 204 provide an indication of engine knock. The signals are processed by controller 206 to identify high frequency vibrations resulting from auto-ignition detonations occurring within the combustion chamber. Typically, the auto-ignition detonations, or knock, result from localized areas of compression ignition that occur in the combustion cylinder prior to the desired onset of combustion. Undesirable knock is controlled via modification of spark timing. Specifically, based on vibration signals 204 indicating knock, controller may issue spark timing signals 208 to modify spark timing and thereby change the timing of combustion onset to reduce knock. Spark timing may be controlled based on knock sensor 182 at various times, including during idle operation of the powertrain and non-idle operation.

Additionally, vibration signals 204 may be processed to identify NVH. NVH thresholds may establish, for example in accordance with known user-satisfaction levels. Typically, NVH thresholds are variable and depend on operating conditions of the vehicle. In any case, controller 206 may be configured to adjust engine load and/or engine speed during idle, based on vibration signals 204. Engine speed at idle is adjusted via control signals 210 (e.g., adjustment of air and/or fuel to the cylinders). Engine load at idle, which can also contribute to NVH, is adjusted via control signals 212. As described in more detail below, control signals 212 may be used to control a hybrid propulsion system, such as that depicted in FIG. 1, to vary load on the engine.

Note that the example control and estimation routines included herein can be used with various engine and/or hybrid powertrain configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12 or controller 206.

Figure 3:
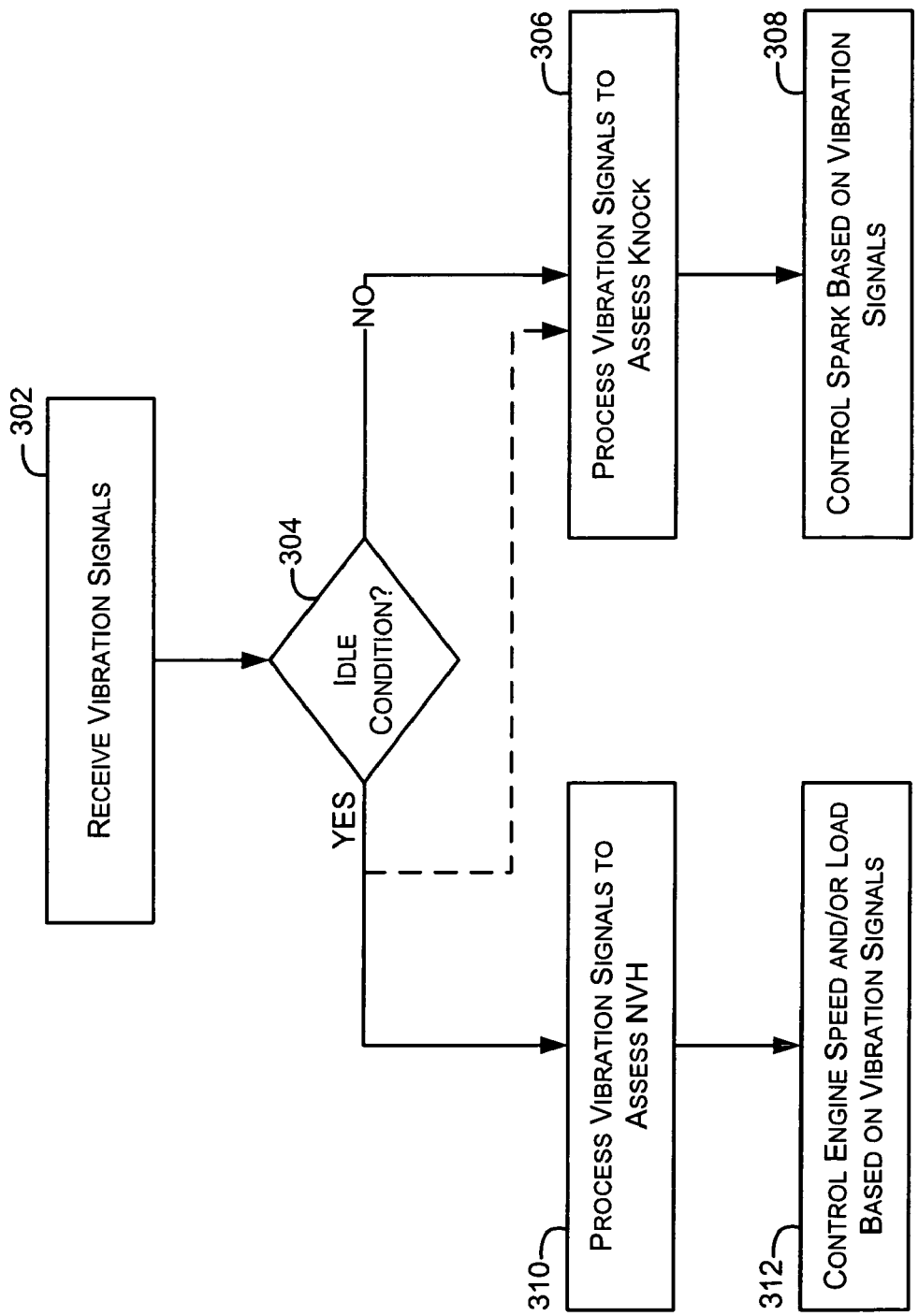
FIGS. 3 and 4 are exemplary methods of controlling a vehicle powertrain, and particularly of controlling engine speed and/or load at idle, in response to vibration signals received from a vibration sensor.

Referring now to FIG. 3, the figure depicts an exemplary method of controlling a vehicle powertrain. At 302, the method includes receiving vibration signals from a sensor. As discussed above, the sensor may be a vibration or detonation sensor, such as knock sensor 182, which is mounted somewhere on the powertrain, typically on the engine block. At 304, the method includes determining whether an idle condition exists. If the powertrain is not in an idle condition, processing proceeds to 306, where the vibration signals are processed to detect knock. At 308, spark timing is controlled in response to the received vibration signals to reduce engine knock.

In the event of an idle condition, processing proceeds from 304 to 310, where the vibrations signals are processed to detect NVH. Processing at step 310 may include analysis of various sensor inputs and operating parameters/conditions of the vehicle in order to determine or set an NVH threshold for the specific operating point of the engine. Sensor inputs to electronic engine controller 12 may be used, for example, to dynamically set the NVH threshold. The vibration signals from the knock sensor may then be analyzed to determine whether the threshold has been exceeded.

The method continues at 312, where engine speed and/or load may be modified in response to the vibration signals. For example, engine speed and/or load may be modified if the vibration signals indicate an established NVH threshold has been exceeded.

Processing at 312 may include increasing or decreasing engine speed during the idle condition in order to bring NVH to within an acceptable level. Speed control may be performed via control over air and fuel being introduced into the combustion cylinders. In the embodiments of FIGS. 1A and 1B, for example, the fuel injectors and/or throttle may be controlled via appropriate control signals from electronic engine controller 12 to modify the engine speed. In many cases, it will be desirable to increase the engine speed, as NVH levels at idle commonly improve as engine speed increases, though the present disclosure also includes reducing engine speed to alleviate NVH. Furthermore, processing inputs may also include design-time or preexisting data concerning natural frequencies of the vehicle. Speed increases or decreases may be performed, for example, so as to avoid having piston firing frequencies align with frequencies known to create resonance in the vehicle.

Processing at 312 may include increasing or decreasing load on the engine during the idle condition in order to bring NVH to within an acceptable level. Load on the engine may be changed via a controlled change in the state of the electrical system of the vehicle, through control of the HVAC systems of the vehicle, or through other methods and controls.

A hybrid system may also be employed to vary engine load at idle in response to vibration signals indicating excessive NVH. Engine load may be reduced, for example, by controlling hybrid propulsion system 13 to operate in a motor mode. Hybrid propulsion system 13 would thus provide torque output to transmission 15, thus lessening the torque output needed from engine 10 to maintain a constant total torque at the transmission. Alternatively, hybrid propulsion system 13 may be controlled to operate in generator mode, thus increasing engine load, in response to the vibration signals indicating excessive NVH.

Figure 4:
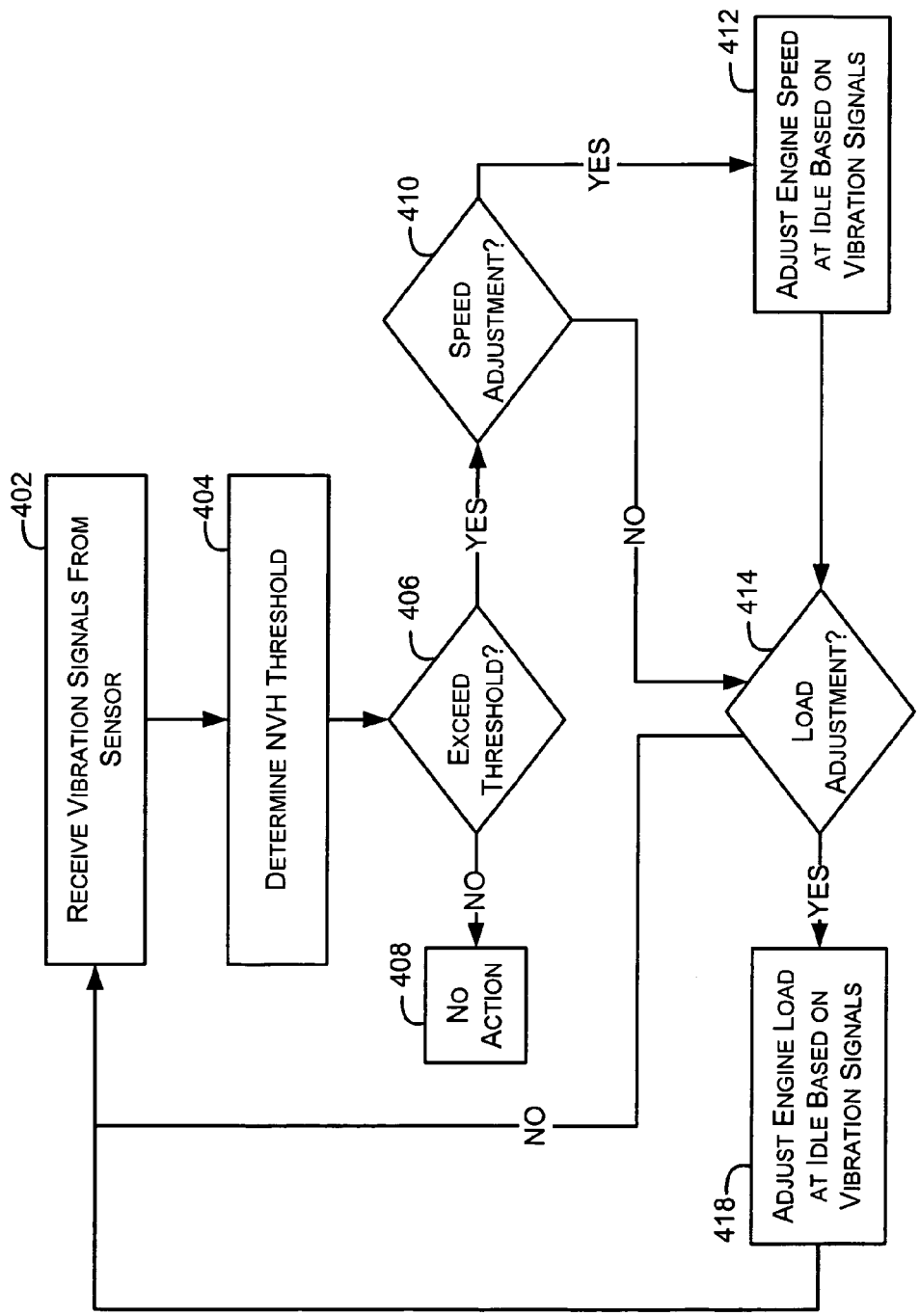

Referring now to FIG. 4, an exemplary method of controlling a powertrain during an idle condition is shown. At 402, the method includes receiving vibration signals from a vibration sensor. This may be performed as described above using knock sensor 182. At 404, the method includes establishing an NVH threshold. The threshold may be predetermined or calculated dynamically during operation, and may be a function of various vehicle parameters and operating conditions.

At 406, the vibration signals are processed and a determination is made as to whether the NVH threshold has been violated. As shown at 408, no adjustment is made if the threshold has not been violated. If the threshold has been violated, processing proceeds to 410, where it is determined whether an adjustment to engine speed is appropriate to address the NVH issue. Based on the vibration signals and other conditions, NVH levels may be modified by adjustment of engine speed, engine load, or both during the idle condition. If an engine speed adjustment is called for, appropriate adjustment is made at 412, in the manner described in the previous examples. Regardless of whether or not a speed adjustment is performed, the method includes determining whether the engine load at idle should be modified, as shown at 414.

If no load adjustment is needed, processing returns to 402. If an adjustment to engine load is warranted, modification is made at 416, as indicated. As described above, engine load modification may be made by controlling generator and motor modes of hybrid propulsion system 13, and/or through other controls.

Use of a vibration sensor such as that described above may also be employed to run diagnostic routines during assembly and testing. A knock sensor may be employed to detect variability issues with vehicle assembly, in order to identify potential NVH issues. According to one example, a knock sensor is used to detect vibrations of an engine, exhaust system or other components that have ground connections to the chassis or body of the vehicle. In this example, the vibration signals may be processed to identify NVH issues and/or verify proper installation (e.g., of the engine mounts, exhaust mounts, body panels, etc).

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating a powertrain of a vehicle, comprising:
   selectively operating the powertrain of the vehicle in at least a non-idle condition and an idle condition, the powertrain including an internal combustion engine;

receiving vibration signals from a knock sensor disposed on the internal combustion engine;
controlling spark timing of the internal combustion engine based on vibration signals received from the knock sensor; and
during the idle condition, modifying at least one of the following operating conditions of the internal combustion engine based on vibration signals received from the knock sensor:
a speed of the internal combustion engine; and
a load of the internal combustion engine.

2. The method of claim 1, where the method includes modifying the speed of the internal combustion engine during the idle condition if vibration signals received from the knock sensor indicate a noise, vibration and harshness (NVH) threshold has been exceeded.

3. The method of claim 2, where the method includes increasing the speed of the internal combustion engine during the idle condition if vibration signals received from the knock sensor indicate the NVH threshold has been exceeded.

4. The method of claim 2, where the method includes decreasing the speed of the internal combustion engine during the idle condition if vibration signals received from the knock sensor indicate the NVH threshold has been exceeded.

5. The method of claim 2, where the method includes modifying the load of the internal combustion engine during the idle condition if vibration signals received from the knock sensor indicate the NVH threshold has been exceeded.

6. The method of claim 1, where the method includes modifying the load of the internal combustion engine during the idle condition if vibration signals received from the knock sensor indicate a noise, vibration and harshness (NVH) threshold has been exceeded.

7. The method of claim 6, where the method includes increasing the load of the internal combustion engine during the idle condition if vibration signals received from the knock sensor indicate the NVH threshold has been exceeded.

8. The method of claim 7, where increasing the load of the internal combustion engine includes operating a hybrid propulsion system of the powertrain in a generator mode.

9. The method of claim 6, where the method includes decreasing the load of the internal combustion engine during the idle condition if vibration signals received from the knock sensor indicate the NVH threshold has been exceeded.

10. The method of claim 9, where increasing the load of the internal combustion engine includes operating a hybrid propulsion system of the powertrain in a motor mode.

11. A method of operating a powertrain of a vehicle, comprising:
operating the powertrain in an idle condition, the powertrain including an internal combustion engine,
receiving vibration signals during the idle condition from a vibration sensor disposed on the internal combustion engine;
determining whether the vibration signals indicate that a noise, vibration and harshness (NVH) threshold has been exceeded; and
if the NVH threshold has been exceeded, modifying at least one of the following operating conditions of the internal combustion engine during the idle condition:
a speed of the internal combustion engine; and
a load of the internal combustion engine.

12. The method of claim 11, where the vibration sensor is a knock sensor configured to control spark timing of the internal combustion engine.

13. The method of claim 12, where the method includes increasing the speed of the internal combustion engine during the idle condition if the NVH threshold has been exceeded.

14. The method of claim 12, where the method includes decreasing the speed of the internal combustion engine during the idle condition if the NVH threshold has been exceeded.

15. The method of claim 12, where the method includes increasing the load of the internal combustion engine during the idle condition if the NVH threshold has been exceeded.

16. The method of claim 15, where increasing the load of the internal combustion engine includes operating a hybrid propulsion system of the powertrain in a generator mode.

17. The method of claim 12, where the method includes decreasing the load of the internal combustion engine during the idle condition if the NVH threshold has been exceeded.

18. The method of claim 17, where decreasing the load of the internal combustion engine includes operating a hybrid propulsion system of the powertrain in a motor mode.

19. A vehicle powertrain, comprising:
an internal combustion engine;
a knock sensor disposed on the internal combustion engine; and
a controller operatively coupled with the internal combustion engine and the knock sensor, the controller being configured to:
perform spark control for the internal combustion engine based on vibration signals received from the knock sensor; and
during an idle condition of the vehicle powertrain, modify a speed of the internal combustion engine based on vibration signals received from the knock sensor.

20. The vehicle powertrain of claim 4, the controller being further configured to modify a load of the internal combustion engine during the idle condition based on vibration signals received from the knock sensor.

21. The vehicle powertrain of claim 20, further comprising a hybrid propulsion system, the controller being further configured to increase the load of the internal combustion engine during the idle condition, based on vibration signals received from the knock sensor, by causing the hybrid propulsion system to operate in a generator mode.

22. The vehicle powertrain of claim 20, further comprising a hybrid propulsion system, the controller being further configured to decrease the load of the internal combustion engine during the idle condition, based on vibration signals received from the knock sensor, by causing the hybrid propulsion system to operate in a motor mode.

* * * * *